United States Patent [19]

Stemmle

[11] Patent Number: 5,040,074
[45] Date of Patent: Aug. 13, 1991

[54] FULL-WIDTH SIMULTANEOUS READ/WRITE COPIER

[75] Inventor: Denis J. Stemmle, Webster, N.Y.

[73] Assignee: Xerox Corporation, Stamford, Conn.

[21] Appl. No.: 517,884

[22] Filed: May 2, 1990

[51] Int. Cl.$^5$ .................... H04N 1/21; H04N 1/034; B41J 2/01
[52] U.S. Cl. .................... 358/296; 358/472; 358/496; 346/140 R
[58] Field of Search ............ 358/296, 302, 401, 472, 358/476, 494, 496, 498, 473; 346/140 R, 75

[56] References Cited

U.S. PATENT DOCUMENTS

| | | | |
|---|---|---|---|
| 4,116,557 | 9/1978 | Kushima . | |
| 4,314,282 | 2/1982 | Fischbeck | 358/476 |
| 4,424,524 | 1/1984 | Daniele | 358/401 |
| 4,466,020 | 8/1984 | O'Connell | 358/300 |
| 4,496,984 | 1/1985 | Stoffel | 358/296 |
| 4,583,126 | 4/1986 | Stoffel | 58/401 |
| 4,635,130 | 1/1987 | Oi | 358/296 |
| 4,636,871 | 1/1987 | Oi | 358/296 |
| 4,707,747 | 11/1987 | Rockwell | 358/473 |
| 4,724,490 | 2/1988 | Tanioka | 358/296 |

*Primary Examiner*—Benjamin R. Fuller
*Assistant Examiner*—Scott A. Rogers
*Attorney, Agent, or Firm*—Duane C. Basch; Ronald F. Chapuran

[57] ABSTRACT

A read/write copier, including an integrally formed image reading and image printing unit. The copier also includes means for feeding a document to be read in unison with a copy substrate material to be printed past both faces of an integrally formed image reading and image printing unit. The image reading and image printing unit further includes a page-wide linear array of image reading elements located on one of the faces of the image reading and image printing unit, where the reading array is oriented in a direction normal to the direction of travel of the document. Furthermore, the reading elements of the reading array generate image signals representative of the document image scanned, by way of an optical path for each of the image reading elements suitable for transmitting image rays as reflected from the document surface to the image reading elements. Also included on the image reading and image printing unit is a light source to illuminate at least a linear portion of the original document as defined by the optical path of the image reading elements. The image reading and image printing unit further includes a page-wide linear array of image printing elements operatively disposed on another face of the image reading and image printing unit, whereby the printing array is oriented in a direction normal to the direction of travel of the copy sheet and whereby a copy of the document image is produced by the printing elements on the copy sheet.

9 Claims, 5 Drawing Sheets

FULL-WIDTH SIMULTANEOUS READ/WRITE COPIER

BACKGROUND OF THE INVENTION

1. Field of the Invention

The invention relates to a combination input and output scanner, and more particularly to a full-width read/write device incorporating a reading head and a printing head to permit substantially simultaneous reading and writing of a document original and copy thereof.

2. Description of the Prior Art

Historically, copies of document originals have been produced by a xerographic process wherein the document original to be copied is placed on a transparent platen, either by hand or automatically through the use of a document handler, and the document original illuminated by a relatively high intensity light. Image rays reflected from the illuminated document original are focused by a suitable optical system into a previously charged photoconductor, the image light rays functioning to discharge the photoconductor in accordance with the image content of the original to produce a latent electrostatic image of the original on the photoconductor. The latent electrostatic image so produced is thereafter developed by a suitable developer material commonly referred to as toner, and the developed image transferred to a sheet of copy paper brought forward by a suitable feeder. The transferred image is thereafter fixed as by fusing to provide a permanent copy while the photoconductor is cleaned of residual developer preparatory to recharging.

More recently, interest has arisen in electronic imaging where in contrast to the above described xerographic system, the image of the document original is converted to electrical signals or pixels and these signals, which may be processed, transmitted over long distances, and/or stored, are used to produce copies. In such an electronic imaging system, rather than focusing the light image onto a photoreceptor for purposes of discharging a charged surface prior to xerographic development, the optical system focuses the image rays reflected from the document original onto the image reading array which serves to convert the image rays to electrical signals. These signals could be used to create an image by some means such as operating a laser beam to discharge a xerographic photoreceptor, or by operating some direct marking system such as an ink jet or thermal transfer printing system.

The prior art related to these types of systems includes, U.S. Pat. Nos. 4,496,984 to Stoffel and 4,583,126, a division of the above identified reference, disclose an input/output scanner for simultaneously reading a document and writing a copy. The document and copy sheet are fed in back to back relation to the read/write station. A monolithic full width reading array reads each line in two steps, to improve resolution. The writing array consists of rows of ink jet nozzles, of which the number and disposition is in direct correspondence to the sensors of the read bar.

U.S. Pat. No. 4,424,524 to Daniele discloses a full width read/write LED array for scanning a document in the read mode or exposing the photoreceptor in the write mode. A Selfoc optical fiber lens array is used for focusing the full width LED array on the document or photoreceptor.

U.S. Pat. No. 4,636,871 to Oi discloses a copying machine comprising separate reading and printing arrays and a scanning mechanism for moving the subject copy. A relative movement between the copying paper sheet and print element and between the document and read element is effected so that scanning is performed in the same pattern on both the reading and printing sides.

U.S. Pat. No. 4,635,130 to Oi discloses a reading/recording apparatus comprising a reading portion having a contact-type one-dimensional image sensor, a recording portion having a contact-type one-dimensional recording head, and a selector switch portion for controlling the image sensor and recording head operation in a sequential fashion.

U.S. Pat. No. 4,7244,490 to Tanioka teaches an image input device having an original exposing portion, and image sensor portion, and a thermal head portion formed by heat generating members. The heat generating members are driven by signals originating in the image sensor portion and are used to effect printing using a thermosensitive copy medium.

A difficulty with these prior art systems is the complexity and cost of separate components, for example, the complex optics, photoreceptor and developer in a typical xerographic process such as the Daniele system. In other systems such as the Stoffel system, it is necessary for an operator to manually combine a document and copy sheet into a single unit for insertion into the machine feed rolls. Moreover, some of these systems would introduce motion quality defects into the output document, due to the relative motion between the read and write assemblies or as a result of sequential page-wide cycling of the one-dimensional read/write arrays. Furthermore, a difficulty of the prior art system, as disclosed by Tanioka, is the practical limitation of the size of such a device, as well as the requirement for a thermosensitive copy medium.

Moreover, it would be generally advantageous if the normally separate document reading and copy printing operations could be combined, thereby simplifying system operation and synchronization problems. In addition, overall system cost would be reduced through the use of fewer parts.

It is an object of the present invention, therefore, to provide a new and improved read/write scanner/printer system in which a read array and print array are both located on the same substrate to simultaneously read a document and print a copy on a copy sheet. It is another object of the present invention to provide a document that is read and a copy that is printed in a page-wide fashion across the document and copy, that is, the reading and copying operations are effected by linear arrays extending the entire width of the document and/or copy sheet at a relatively higher resolution. It is another object of the present invention to integrally affix a means for illuminating an original document and a means for focussing the light rays, as reflected from the document, to the read array on a common substrate, thereby enabling a compact, self-contained unit requiring no post manufacturing adjustments. It is a further objective of the present invention to provide a scanner/printer system with full-width read and print arrays capable of producing copies at an increased rate.

SUMMARY OF THE INVENTION

The present invention is a combined input and output scanning system for reading pixel information from a document and printing it on a copy medium, comprising in combination an integrally formed image reading and image printing unit, means for feeding a document to be read in unison with a copy substrate material to be printed past one or more faces of an integrally formed image reading and image printing unit, a page-wide linear array of image reading elements operatively disposed on one face of the image reading and image printing unit, where the reading array is oriented in a direction normal to the direction of travel of the document. Furthermore, the reading elements of the reading array generate image signals representative of the document image scanned, by way of an optical path for each of the image reading elements suitable for transmitting image rays as reflected from the document surface to the image reading elements. In addition, there is included a means to illuminate at least a linear portion of the original document as defined by the optical path of the image reading elements, and a page-wide linear array of image printing elements operatively disposed on a face of the image reading and image printing unit, whereby the printing array is oriented in a direction normal to the direction of travel of the copy sheet and whereby a copy of the document image is produced by the printing elements on the copy sheet.

BRIEF DESCRIPTION OF THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1:
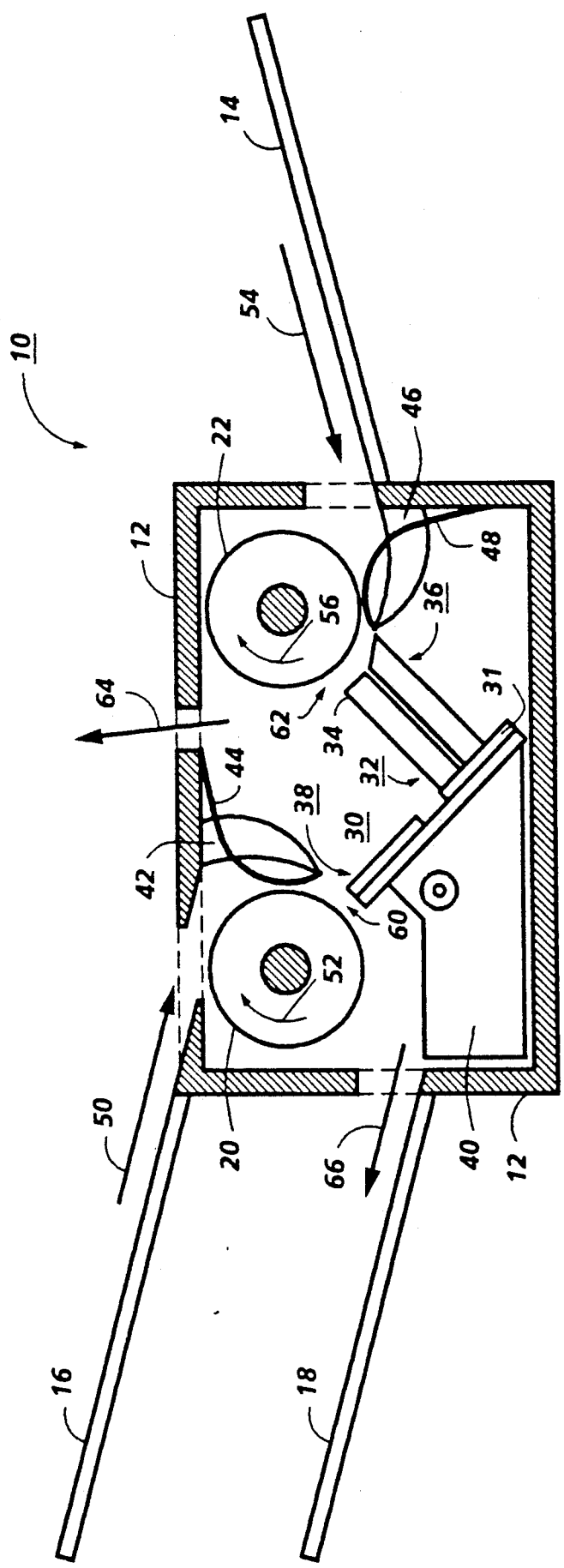
FIG. 1 is a schematic illustration of the read/write copier of the present invention.
Figure 2:
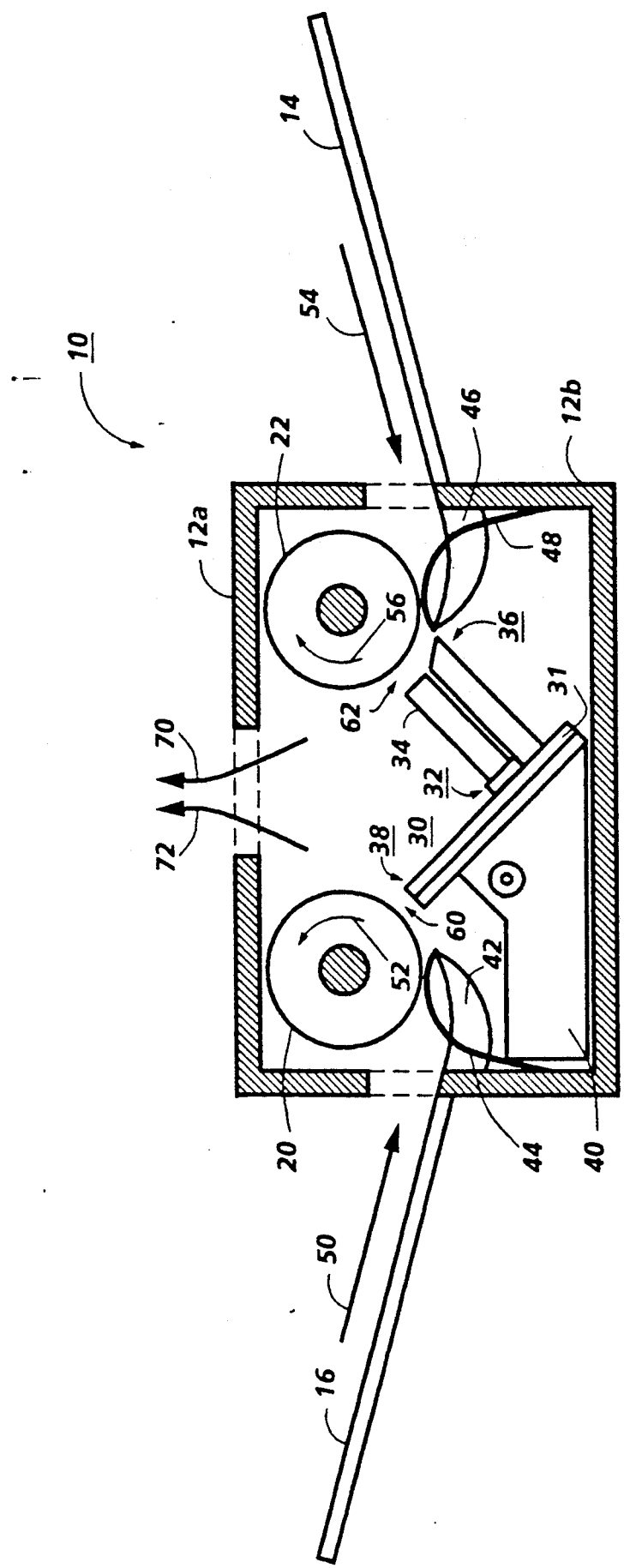
FIG. 2 is a schematic illustration of an alternate implementation of the read/write copier of the present invention.

Referring to FIG. 1 and 2 of the drawings, there is shown a combined input/output scanner, designated generally by the numeral 10. Input/output scanner 10 is enclosed within cover 12, and optionally includes a copy sheet input tray 16, a document sheet input tray 14 and a copy sheet output tray 18. Disposed within the input/output scanner are continuous velocity transport (CVT) rolls for copy sheet and document feeding, 20 and 22 respectively, which are driven by a common drive motor and gear assembly (not shown). Also mounted within scanner 10 is a read/write unit or assembly, generally referred to by reference numberal 30, including full-width array image bar 32, lens 34, illumination source or LED array 36, full-width array print bar 38, and marking ink reservoir 40. Read/write assembly 30 is mounted in such a manner so as to position lens 34 and LED array 36 in close proximity to the outer circumferential surface of document feed CVT roll 22, and full-width array print bar 38 in close proximity to the outer circumferential surface of copy sheet CVT roll 20. This assembly scans or reads documents fed via tray 14, the document image areas, as scanned, being converted into electrical image signals representative of each pixel.

While the image signals so produced may be output to a suitable memory for storage or subsequent processing, to a communication channel, printer, and the like, in a preferred embodiment, the image signals generated by the full-width array image bar are input into full width array print bar 38. Print bar 38, which may be any suitable direct imaging device such as a thermal transfer head, or preferably a thermal ink jet array, to write copies of the document originals in accordance with the image signals onto a suitable substrate or copy sheet. As will be understood, the number of scanning elements or sensors that comprise image bar 32 determine the initial scanning resolution while the number of ink jet nozzles that comprise print bar 38 determine the resolution of the image copy. In the preferred embodiment, the number of input scanning elements may equal the number of output printing elements.

Once again referring to FIG. 1, operation of the scanner is effected by inserting a copy sheet into tray 16 until the sheet frictionally engages CVT roll 20, as caused by forcing the travel of the copy sheet against CVT roll 20 with paper guide 42 and spring 44. After insertion of the copy sheet, the document sheet is loaded in a similar manner into tray 14, until it comes into contact with CVT roll 22, as guided by paper guide 46 and spring 48.

Subsequent to activation of a Start button (not shown), the document sheet is automatically feed in the direction indicated by arrow 50, as caused by the rotation of CVT roll 20 in a direction indicated by arrow 52. Simultaneously, the document sheet is feed in the direction indicated by arrow 54 by CVT roll 22 rotating in a direction indicated by arrow 56. Rotation of both CVT rolls causes the indexing of copy sheet and document to the respective writing and reading stations, 60 and 62.

Upon entering reading station 62, the document is illuminated by LED array 36, causing light to be reflected from the surface of the document. Reflected light is then captured by lens 34 and conducted to the imaging elements of full-width array image bar 32. The light incident on the imaging elements of image bar 32 is converted into an electrical signal that is subsequently transferred to the appropriate printing element on print bar 38. As reflected from the document surface, a black mark will not cause depletion of charge within the imaging element of image bar 32 and will thereby enable a maximum signal level to be transferred to the corresponding printing element of print bar 38, thereby thus causing the output of a printing mark on the copy sheet.

Subsequent to scanning, the lead edge of the original document is directed in a manner to cause it to exit the scanner in the direction indicated by arrow 64. In a similar fashion, the copy sheet is simultaneously directed to copy sheet output tray 18 in the direction indicated by arrow 66.

Referring now to FIG. 2, which depicts an alternate implementation of a read/write copier in accordance with the present invention, where the direction of travel of the copy sheet is opposite the direction of travel of the original document. The distinction is evidenced by the opposing direction of rotation between copy sheet CVT roll 20 and document CVT roll 22 as indicated by arrows 52 and 56 respectively. Operation of read/write copier 10 in this configuration would require that the output of the print array 38 be a mirror image of the image scanned by imaging array 32. Such a mirror image is created by buffering a raster of image information in random access memory (RAM) 94 of FIG. 3, while a previous line of information is being read from RAM and printed in a direction opposite that in which it was stored. This configuration requires dual-ported RAM with a size equal to or greater than twice the number of imaging elements on the read bar, to enable the simultaneous writing of image information, from image bar 32, while reading image information stored from the previous raster to drive the printing elements of print bar 38.

Figure 3:
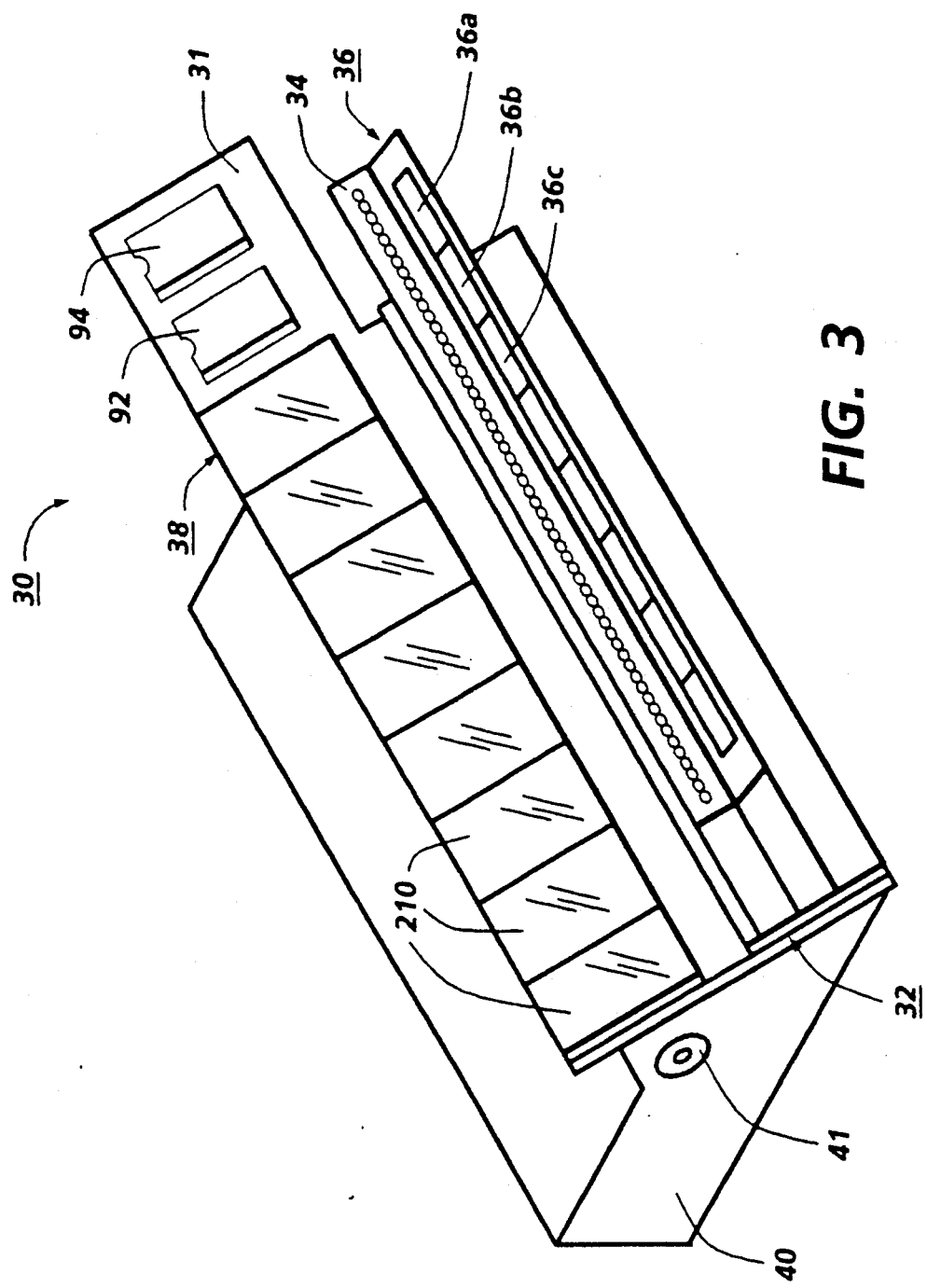
FIG. 3 is an isometric view of the read/write unit of FIGS. 1 and 2.

FIG. 3 depicts an isometric view of read/write assembly 30 of FIG. 1. Read/write assembly 30 includes a monolithic read bar 32 having a plurality of electrically integrated single chip read arrays mounted upon a planar substrate 31.

Figure 4:
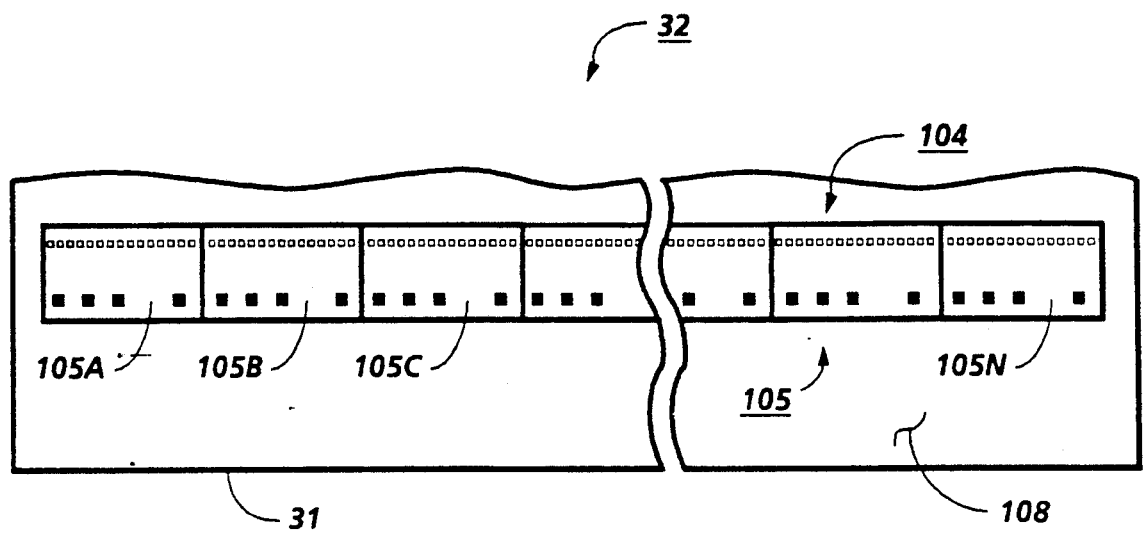
FIG. 4 is a top view of the monolithic read array of the present invention.

Referring particularly to FIG. 4 of the drawings, there is shown a full width scanning array 32 composed of a subassembly 104 of smaller sensor chips or arrays 105 assembled end-to-end (specific chips are identified by numerals 105A, 105B, . . . 105N) on an elongated rectangular substrate 31. Substrate 31, which may comprise any suitable substrate material such as ceramic or glass, and may have an electrically conductive metallic covering or coating such as copper on a portion of the planar surface 108 thereof on which subassembly 104 is mounted.

As will be understood by those skilled in the art, array 32 is typically used to read or scan a document original line by line and convert the document image to electrical signals. Preferably, array 32 is a full width array having an overall length equal to or slightly greater than the width of the largest document to be scanned.

Figure 5:
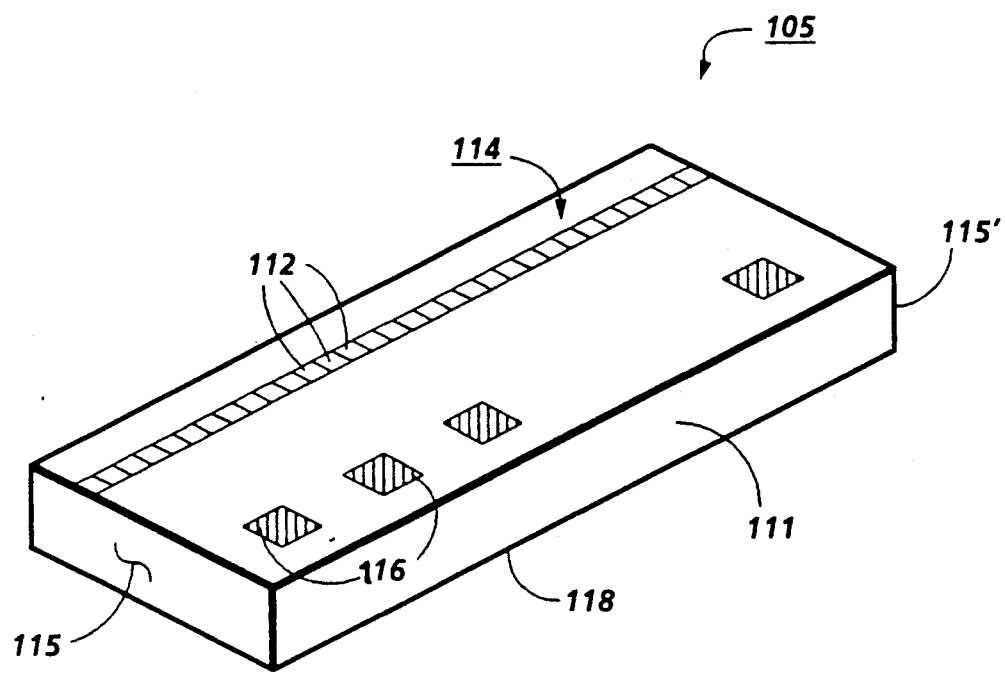
FIG. 5 is an isometric view of a single chip of the monolithic read array of FIG. 5.

Furthermore, as shown in FIG. 5, chips 105, which may, for example, be Charge Coupled Devices (CCDs), comprise a relatively thin silicon die 111 having a generally rectangular shape. A row 114 of photosites 112 parallels the longitudinal axis of the chips. Other active elements such as shift registers, gates, pixel clock, etc., are preferably formed integral with die 111. Chips 105 have suitable external connectors, shown here as bonding pads 116 and one or more conductors such as copper strips (not shown) along the bottom 118 thereof, the latter serving to electrically ground chips 105.

Chips 105 are provided with substantially flat, square ends 115, 115' designed to enable chips 105 to be accurately abutted together with one another without distortion or other artifact. Chips suitable for this purpose may, for example, be formed in the manner described in U.S. Pat. No. 4,814,296, issued on Mar. 21, 1989, in the names of Josef E. Jedlicka et al.

When a single chip 105 is used for scanning purposes, the image resolution achieved is a function of the number of photosites 112 that can be fabricated on the chip divided by the width of the scan line. Since the number of photosites 112 that can be packed onto a single chip is limited, it is advantageous to assemble plural chips together in a longer array, and preferably to form a full-width or full size array whose scan area is coextensive with the scan line. Full size arrays of this type are currently capable of scanning an image with a resolution of 600 spots per inch (spi) or greater. In the present invention, a plurality of chips 105A, 105B, . . . 105N are secured in abutting end-to-end relation to form a continuous and uninterrupted row of photosites with a substantially uniform periodicity.

Referring again to FIG. 3, there are shown the imaging elements of image bar 32 located beneath lens 34. Lens 34, which may be a Selfoc lens having a plurality of light conducting fibers arranged in a linear fashion, for the purpose of conducting light rays from the upper surface of the lens to a lower surface in contact with assembly 104 of image bar 32.

Also included in assembly 30 is an LED array 36, further including a linear array of LED's 36a,b,c, for the purpose of illuminating the original document passing through imaging station 62 of FIG. 1. The upper surface of LED array 36 being angled slightly to maximize the amount of light incident upon the light conducting fibers of lens 34, as reflected from the surface of the original document within imaging station 62 on the outer circumferential surface of document CVT roll 22 of FIG. 1.

Figure 6:
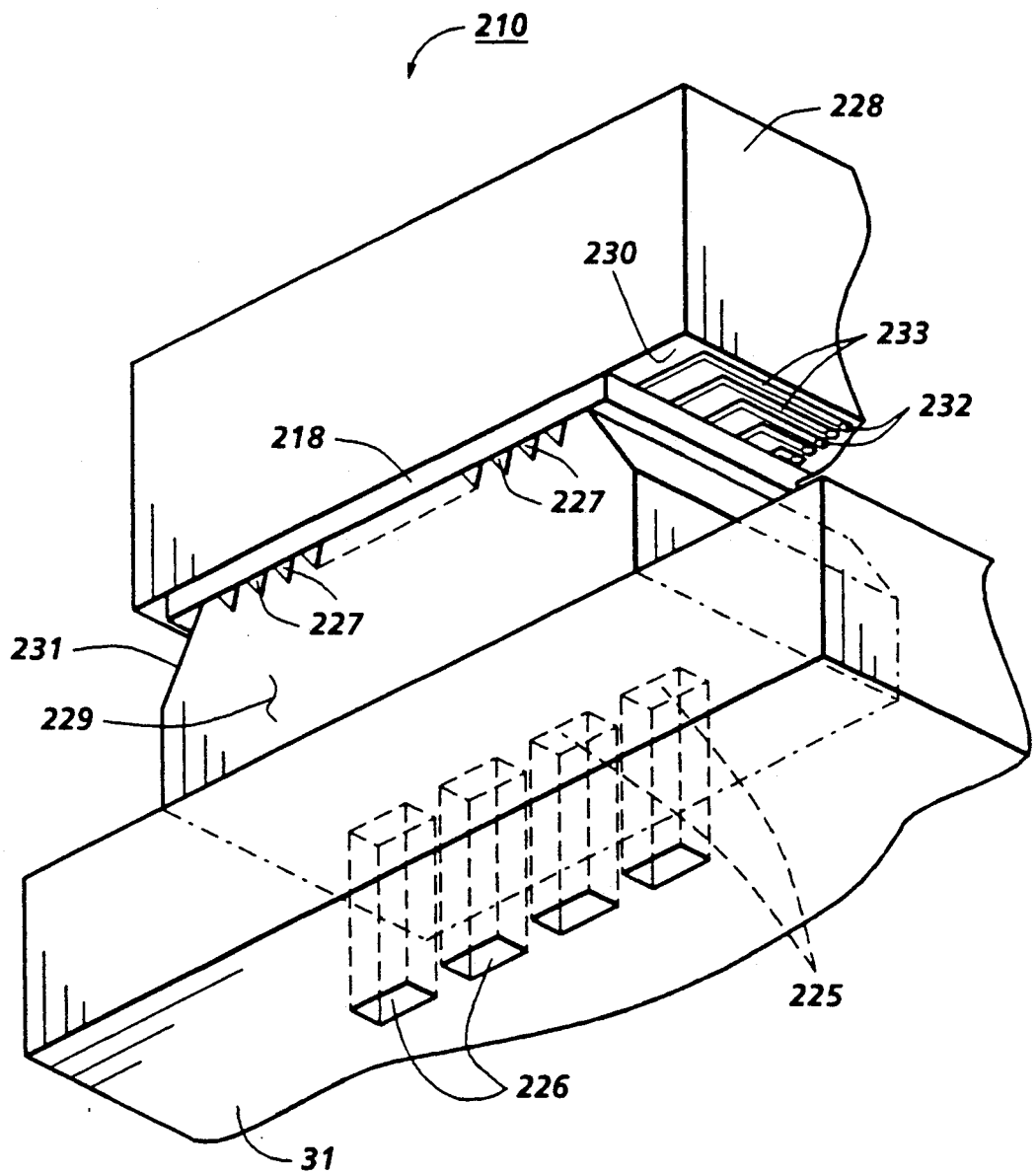
FIG. 6 is an isometric view of a single chip of the monolithic write array of the present invention.

Further included in assembly 30 are a plurality of print arrays 210 of FIG. 6, also mounted upon substrate 31, which together comprise print bar 38. Referring now to FIG. 6, which is an isometric view of the front face 229 of print array 210, showing an array of droplet emitting nozzles 227. The upper electrically insulating substrate 228 has heating elements (not shown) and addressable electrodes (not shown) patterned on the lower surface thereof, while the lower substrate or channel plate 231 has parallel grooves (not shown) which extend in one direction and penetrate through the upper substrate front face edge 229. The other end of the grooves terminate in the interior of channel plate 231 after intersecting through recess 225, which is used as the ink supply manifold or reservoir for the capillary filled ink channels formed by the parallel grooves, and are directly connected to marking ink reservoir 40 of FIG. 3, by through holes 226 in substrate 31. The surface of channel plate 231 with the grooves, is aligned and bonded to the heater plate 228, so that a respective one of the plurality of heating elements is positioned in each channel formed by the grooves and the upper substrate or heater plate 228. Ink enters the manifold formed by recess 225 and the upper substrate 288 through inlets 226 and, by capillary action, fills the associated channels by flowing through one or more recesses (not shown) patterned in the insulative layer 218 of heater plate 228. The ink at each nozzle 227, forms a meniscus, the surface tension of which prevents the ink from weeping therefrom. The addressing electrodes 233 on the upper substrate or channel plate 228 terminate at terminals 232. The lower substrate or channel plate 231 is smaller than that of the upper substrate in order that the electrode terminals 232 are exposed and available for wire bonding to electrodes on substrate 31, on which printhead 210 is permanently mounted. Layer 218 is a thick film passivation layer, sandwiched between upper and lower substrates, patterned to expose the heating elements (not shown), thus placing them in a cavity, and also patterned to form a single elongated recess or a linear series of recesses to enable ink flow between the manifold 225 and the associated ink channels. In addition, the thick film insulative layer 218 is patterned to expose the electrode terminals 232.

Operation of printhead 210 is effected by the application of a current pulse, via addressing electrodes 233, to a thermal energy generator or heater, located in the capillary-filled, parallel ink channels a predetermined distance upstream from the channel nozzles or orifices. Operation of the heaters results in the formation of bubbles which propagate outwardly to nozzle 227, and upon reaching nozzle 227, cause a perturbation in the meniscus formed thereon, thereby effecting the release of an amount of ink to the copy sheet or other transfer medium.

Another embodiment of the present invention reduces the overall complexity of read/write assembly 30, by combining the production of the read and write elements onto a single integrated chip. Specifically, each chip has a read portion and a write portion formed thereon, and a plurality of these integrated read/write chips are combined into a monolithic read/write array. This embodiment decreases the assembly time for read/write assembly 30, while eliminating the need for alignment of the read and write bars with respect to one another.

Referring once again to FIG. 3, there is shown substrate 31, which functions not only as a mechanical mount for read bar 32 and write bar 38, but also may contain electrical circuitry required for the interconnection of the read and write arrays, 32 and 38 respectively, as well as, control logic chip 92 and optional RAM chip 94. Control logic chip 92 may, in accordance with the present invention, operate in conjunction with RAM 94, to enable the selective alteration or processing of the stored image information received from read array 32. Once altered by the image processing hardware optionally included in control logic chip 92, the image information, as stored in RAM chip 94, would be passed to write array 38. Optional image processing capability of this nature enables enhanced copy output and a wider range of acceptable input documents. Moreover, substrate 31 is integrally fastened to marking ink reservoir 40, as filled through ink refill port 41, and provides through holes 226 of FIG. 6, in which ink from marking ink reservoir 40 can migrate to print bar 38.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. In a system having linear array of image reading elements and an array of image printing elements, the method of making a copy of a document onto a copy substrate material comprising the steps of:
    feeding said document past said linear array of image reading elements at a constant velocity, said linear array of image reading elements being located on a planar surface of an integrally formed read/write assembly;
    feeding said copy substrate material past said linear array of image printing elements at the constant velocity, said printing elements also located on said planar surface of said integrally formed read/write assembly;
    operating said reading elements to obtain data representing indicia on the document, as the document is moved past said reading elements;
    storing said representative data in memory;
    processing said representative data stored in memory to produce an improved representation of the indicia; and
    operating said printing elements in response to said processed data, thereby producing indicia in response to said processed data, said indicia being formed upon said copy substrate material as said material is moved past said writing elements.

2. The method according to claim 1, wherein said reading and printing elements operate on a single raster in a page-wide manner.

3. A system for the production of copies, comprising:
    a page-wide array of image reading elements;
    an image reading station whereby an original document may be properly exposed to said image reading elements;
    a page-wide array of image printing elements;
    an image printing station whereby a copy substrate may be properly exposed to said image printing elements; and
    means for aligning said page-wide array of image reading elements and said page-wide array of image printing elements in a parallel fashion and on a single surface, whereby said image reading elements are aligned with respect to said image reading station and said image printing elements are aligned with respect to said printing station, said means for aligning said page-wide array of image reading elements and said page wide array of image printing elements further comprising:
    a plurality of integrated read/write chips linearly disposed on said single surface in a page-wide direction said integrated read/write chips having a linear series of said image reading elements and a linear series of said image printing elements formed thereon, wherein said linear series of image reading elements is disposed a fixed distance from and parallel to said linear series of image printing elements.

4. The system of claim 3, wherein said single surface is integrally mounted to said system, thereby remaining stationary during the operation of said system.

5. A combined input and output scanner comprising in combination:
    an integrally formed image reading and image printing unit;
    means for feeding a document to be read at a constant velocity past a first face of said integrally formed image reading and image printing unit;
    a page-wide linear array of image reading elements operatively disposed on the first face of said image reading and image printing unit, said reading array oriented in a direction perpendicular to the direction of travel of said document, said reading elements of said reading array generating image signals representative of the document being read;
    means for forming an optical path for each of said image reading elements for transmitting image rays as reflected from the document surface to said image reading elements;
    means to illuminate at least a linear portion of said document as defined by the optical path of said image reading elements;
    means for feeding a copy substrate material at a constant velocity past a second face of said integrally formed image reading and image printing unit, wherein the second face is adjacent to the first face, said substrate feeding means operating in unison with said document feeding means;
    an image buffer for storing one or more rasters of image signals in a first direction and outputting the image signals in an opposite direction; and a page-wide linear array of image printing elements, said image printing elements being responsive to the image signals output from said image buffer, said printing array being operatively disposed on the first face of said image reading and image printing unit, so as to operatively extend the second face of said unit, said printing array oriented in a direction perpendicular to the direction of travel of said copy substrate material, whereby a copy of the document image is produced by said printing elements on said copy substrate material.

6. The scanner according to claim 5, wherein said integrally formed image reading and image printing unit further includes:

a page-wide linear array of image reading elements and a page-wide linear array of image printing elements disposed thereon, said page-wide arrays consisting of a plurality of integrated read/write chips abutted against one another, said integrated read/write chips having both the reading and printing elements formed thereon, said reading elements generating image signals representative of the document image read which are subsequently transmitted to said image printing elements.

7. A combined input and output scanner comprising in combination:

an integrally formed image reading and image printing unit having a page-wide linear array of image reading elements and a page-wide linear array of image printing elements disposed thereon, said page-wide arrays consisting of a plurality of integrated read/write chips abutted against one another, said integrated read/write chips having both the reading and printing elements formed thereon, said reading elements generating image signals representative of the document image read which are subsequently transmitted to said image printing elements;

means for feeding a document to be read at a constant velocity past said integrally formed image reading and image printing unit;

means, operating in unison with said document feeding means, for feeding a copy substrate at a constant velocity past said integrally formed image reading and image printing unit;

means for forming an optical path for each of said image reading elements for transmitting image rays as reflected from the document surface to said image reading elements;

means to illuminate at least a linear portion of said document as defined by the optical path of said image reading elements;

memory means for storing the image signals generated by said image reading elements, said signals being indicative of indicia contained upon the document; and image processing means, operative upon the image signals stored in said memory means, for selective alteration of the image signals prior to passing such signals to said printing elements, said image processing means being capable of enhancing the copying capabilities of said input and output scanner, whereby the indicia printed upon the copy substrate may not exactly duplicate the indicia as originally read by said image reading elements.

8. The combined input and output scanner of claim 7, wherein said memory means is comprised of a plurality of memory locations, such that said memory means is suitable for storing one or more raster image signals from said image reading elements.

9. The combined input and output scanner of claim 8, wherein said memory locations are addressable in such a manner so as to enable the storage of the image signals in a first sequential order and the retrieval of the image signals in an opposite sequential order.

* * * * *